Aug. 22, 1967    E. AMOTT    3,336,977

SECONDARY RECOVERY

Filed July 27, 1965

INVENTOR
EARL AMOTT
BY
Richard C. Newton
ATTORNEY

United States Patent Office 3,336,977
Patented Aug. 22, 1967

3,336,977
SECONDARY RECOVERY
Earl Amott, Fullerton, Calif., assignor to Union Oil Company of California, Los Angeles, Calif., a corporation of California
Filed July 27, 1965, Ser. No. 475,190
16 Claims. (Cl. 166—9)

This invention relates to the secondary recovery of petroleum from subterranean formations, and in particular concerns an improved water flooding process wherein a water mobility modifying agent is deposited in the formation prior to injection of the flood water.

Heretofore, it has been recognized that the recovery of petroleum from subterranean formations is relatively inefficient with respect to the quantity of oil remaining unrecovered in the oil-bearing subterranean strata. Various secondary methods of increasing oil recovery have been practiced, including the well known technique of injecting water into the formation through an injection well to drive additional oil toward one or more production wells spaced apart from the injection well. Although an additional quantity of oil can be recover by such water flooding technique, the efficiency of the water flood and ultimate oil recovery can be further improved by the addition of various known viscosity increasing or thickening agents to at least the initial portion of the injected water. Increased viscosity reduces the water mobility and tends to prevent fingering of the flood water through the more permeable zones of the oil-bearing strata, thereby achieving a more uniform flood front and improved oil recovery. In the prior art viscous water flood processes, the viscosity modifying agent is preferably added in an amount which will increase the viscosity of the flood water sufficiently to obtain a mobility ratio of about unity, the relative mobility of the water within the formation behind the front then being about equivalent to that of the oil ahead of the front.

Even though improved performance can be attained by the use of the aforementioned viscous water flooding techniques, undesired fingering of the water within the oil-producing strata is not completely eliminated and formation sweep efficiencies are not improved to the extent desired. The fingering experienced in prior art viscous water floods is in part attributable to the fact that the injected viscous water moving through the strata is preceded by a bank of displaced connate water which does not contain viscosity modifier. Thus, in a conventional viscous water flood, the oil is actually displaced by the bank of connate water which in turn is displaced by the viscous water. Since the connate water does not contain viscosity modifying agent, the mobility of this water within the formation is high with regard to the mobility of the displaced oil resulting in a low mobility ratio as conventionally defined. Because of this low mobility ratio, the bank of connate water actually serving as the oil displacing fluid is susceptible to fingering through the more permeable strata; thereby resulting in premature water breakthrough, decreased flooding efficiency, high producing water/oil ratios, increased water injection requirements per barrel of oil recovered, and lower ultimate oil recovery than could otherwise be achieved if the effects of the viscous water were fully realized.

It is accordingly an object of this invention to provide an improved water flooding process wherein the oil is displaced from the formation by water of reduced mobility. Another object is to provide a method of increasing the mobility of the connate water within an oil-bearing formation preparatory to displacing the oil by conventional water flooding techniques. A further object is to provide a method of viscous water flooding wherein the oil recovery per volume of injected water is increased. A still further object is to provide a method of viscous water flooding wherein the producing water/oil ratio over the duration of a water flood project is substantially lower than that experienced with conventional techniques.

These and related objects, which will be apparent from the following description, can be realized in accordance with this invention by injecting a suspension of water-soluble viscosity modifier in a non-solvent carrier liquid directly into the formation prior to a conventional water flood. The viscosity modifier is dissolved in the water present in the formation, thereby effecting an increase in the viscosity of this water with resultant reduced mobility. Water is injected into the formation through an appropriately located injection well causing displacement of a substantial portion of the oil to the production wells. As the injected water advances through the formation, low mobility water is present at the water-oil interface. Thus, connate oil is displaced from the formation directly by a bank of water of reduced mobility, which in turn is displaced by the injected water. By means of this technique, a more uniform flood front is achieved with a minimum of water fingering. Water breakthrough into the production wells is delayed until a later stage of the flood, as measured either in terms of the total volume of water injected or in terms of the total oil recovery. Further, the producing water/oil ratio is substantially lower than experienced with conventional water floods or viscous water floods, and the total oil recovery is higher than can be attained with these methods.

The viscosity modifier can be conveniently injected into the producing formation as a fine dispersion in a non-solvent carrier liquid, preferably in a liquid miscible with the connate oil. When injected in this manner, the carrier fluid containing finely dispersed viscosity modifier can be injected into the formation to achieve deep penetration throughout the zone to be flooded, thus assuring that viscosity modifier will be present in the water at the flood front. The injected carrier liquid can contain up to about 20 percent dispersed viscosity modifier; dispersion stability and injectivity being the factors usually limiting the concentration of the dispersed phase.

The viscosity modifier employed in accordance with this invention can be either a liquid or a finely divided solid, so long as it can be suspended in the carrier oil and injected into the formation. Since most of the preferred viscosity modifiers are water-soluble solids, the viscosity modifier is usually injected in the form of a finely ground solid suspension. However, no matter whether the viscosity modifier is injected as a liquid or a solid suspension, it is preferably sufficiently finely divided to pass into the formation without substantial separation from the carrier oil at the formation interface. Injectivity can be enhanced by reduction of the viscosity modifier to colloidal size particles.

The various known viscosity increasing additives which can be applied by the method of this invention include fatty acid soaps, alginates, sucrose, glycerine, finely divided clays such as montmorillonite, and a number of water-soluble polymers. Of these, the water-soluble polymers are generally preferred. Preferred polymers include modified starches, xanthum gum obtained by the fermentation of starch-derived sugar, alkyl and hydroalkyl cellulose derivatives, carboxymethyl cellulose, polyvinyl alcohol, polyvinyl pyrrolidone, polyacrylic acid, polyacrylamide, polystyrene sulfonates, ethylene oxide polymers, the various homologs of these polymers, and copolymers of two or more of these materials, or copolymers of the aforementioned polymers with other polymeric substances.

A specially preferred polymer is a partially hydrolyzed polyacrylamide, and particularly such polymer having between about 12 to about 67 percent of the carboxamide groups hydrolyzed to carboxyl groups and characterized by a molecular weight of at least 500,000 and preferably 1,000,000 or more. With these high molecular weight polyacrylamides, it is possible to obtain aqueous solutions having a desirably increased viscosity with the use of a minimum amount of polymeric ingredient. Further, the viscosity of a standard solution of polymer under controlled conditions is correlated with the molecular weight of the polymer. Accordingly, the hydrolyzed polyacrylamides preferred for use in the invention are those characterized by a viscosity of at least 6 centipoises for a 0.5 percent by weight solution thereof in aqueous 4 percent by weight sodium chloride solution at a temperature of 25° C. as determined with an Ostwald viscosimeter.

The term "hydrolyzed" polyacrylamide as employed herein is inclusive of the modified polymers wherein the carboxyl groups are in the acid form and also such polymers wherein the carboxyl groups are in the salt form, provided that the salts are water-soluble. Thus, for example, the hydrolyzed polyacrylamide can be employed to form a sodium, potassium, or other alkali metal salt, the ammonium salt, or mixed salts of sodium, potassium, magnesium, calcium and the like. Salts of polyvalent ions, such as iron and aluminum, are to be avoided for reasons of insolubility. The polyacrylamides, from which the hydrolyzed polyacrylamides of the invention are derived, may be homopolymers of acrylamide or copolymers thereof with up to about 10 percent by weight of other suitable polymerizable vinyl compounds such as vinyl acetate, acrylonitrile, methyl acrylonitrile, vinyl alkyl ether, vinyl chloride, and the like, provided that the copolymers so employed are characterized by water-solubility and freedom from cross-linking. Particularly preferred copolymers are those formed by the copolymerization of acrylamide with maleic anhydride or acrylic acid.

Any liquid substance in which the viscosity modifier is insoluble and which is miscible with the connate hydrocarbons can be employed as carrier liquid to transport the viscosity modifier into the formation. Particularly suitable are various liquid hydrocarbons. A portion of crude oil previously recovered from the formation is a convenient source of non-solvent carrier liquid. Alternatively, other crude oil of a type similar to that recovered from the formation can be used. Where available, semi- or fully-refined hydrocarbon liquids can also be employed. In any event, the viscosity modifier is suspended in the carrier liquid and injected into the formation in conventional manner, either through the injection well or one of the production wells.

On injection of the viscosity modifier into the formation, all or a portion of the water-soluble material is dissolved in the formation water. This water may be connate water or water previously injected for secondary recovery of other purposes. As an upper limit, the amount of polymer injected is calculated as that quantity required to increase the viscosity of the water to a value which will result in this water having a mobility in the formation substantially similar to that of the connate oil. In practice, it is found that satisfactory results are obtained with substantially lower addition rates. Although it can be broadly stated that the effective additive concentration range in the treated water is between about .001 and 10.0 weight percent, depending on the particular additive employed and the treating conditions, good results are often obtainable at additive concentrations of less than .01 percent, particularly with the preferred polymers. Practical concentration ranges are often found to be substantially below that required to achieve a mobility ratio of unity, thus materially reducing the amount of additive required for a particular viscous water flood. Additional viscosity modifier can be added to the injected water, if desired. However, in the usual case, no supplemental addition is required, but if added, a lower concentration of modifier would usually suffice than required for conventional viscous water flooding.

On placement of the viscosity modifier in the formation, conventional water flooding is started by injecting flood water into the formation through an injection well. The flood water causes displacement of the thickened water, forming a bank of low mobility water preceding the injected water, which in turn displaces the oil toward the spaced production wells.

In employing the secondary recovery technique of this invention, wherein the oil is displaced from the formation by water having reduced mobility, superior sweep efficiency is obtained. This is first evidenced by a substantial increase in the amount of oil recovered by water flooding prior to break-through of the water, and secondly, by a substantially reduced producing water/oil ratio over the duration of the water flood operation. The net effect of this increased efficiency is that the amount of water which must be injected during the life of the water project is substantially reduced over that required for the same total oil recovery with either conventional high mobility water, or with the prior art viscous water flooding techniques.

As previously disclosed, the dispersed viscosity modifier is preferably extremely finely divided in order that it can be successfully passed into the formation without separation from the carrier liquid. In the case of liquid modifiers, the immiscible additive and carrier liquids can be intimately mixed by any of the conventional methods to accomplish the requisite fine subdivision. Preferably, the immiscible liquids are emulsified so that the additive is colloidally dispersed within the carrier liquid. With the solid viscosity modifying agents more commonly employed, size reduction is first accomplished, if necessary, by grinding and screening to obtain a fines portion of less than 200 mesh U.S. Standard sieve size. These fines are then admixed with an appropriate portion of carrier liquid and further ground by any of the well-known methods of preparing suspensions, such as those employed in the paint industry, for example. The ultimate objective of this step being to reduce the additive particles to a size which will remain in suspension during the injection step and which will readily pass into the formation without separation from the carrier liquid. Preferably, a colloidal suspension of additive in carrier liquid is obtained, although particles of larger than colloidal size can be effectively utilized.

The method of this invention and the substantially improved performance resulting therefrom is demonstrated by the following examples which are presented by way of illustration, and are not intended as limitation of the spirit and scope of the appended claims.

*Example 1*

A conventional water flood is simulated by displacing oil from a test core with unmodified, high mobility water. The test core is high permeability Boise sandstone, approximately three inches in length and one inch in diameter, held in a Hassler sleeve. The core is prepared by first drying at a temperature of 1500° F., followed by acid extraction. The dry core exhibits an air permeability of 2540 md. and a porosity of 32 percent. The test core is restored by saturating with a 3 percent brine solution, and flushing first with 400 ml. of kerosene and finally with 75 ml. of a refined oil having a viscosity of 33.4 cp. at 75° F. The restored core is 72.1 percent oil saturated.

Simulated flooding is then started by passing distilled water through the core at 8.0 p.s.i.g. inlet pressure, which pressure is held constant during the entire water injection step. Liquid displacement from the core by the injected water is collected in a number of cuts and the quantity of oil and water in each cut is determined. These results are presented in Table A.

subjected to water flooding. However, in this example the viscosity modifying agent is deposited in the core prior to the injection of flood water. As before, the test core

TABLE A.—CONVENTIONAL WATER FLOOD

| Cut No. | Produced Oil, ml. | | Produced Water, ml. | | Producing Water/Oil Ratio | Oil Saturation, Percent | Oil Recovered, Percent Original | Cum. Water Injected | |
|---|---|---|---|---|---|---|---|---|---|
| | Cut | Cum. | Cut | Cum. | | | | Ml. | Pore Vol. |
| 0 | 0 | 0 | 0 | 0 | | 72.1 | 0 | 0 | 0 |
| 1 | 2.80 | 2.80 | 0 | 0 | 0 | 48.7 | 32.6 | 2.80 | 0.23 |
| 2 | 1.50 | 4.30 | 2.50 | 2.50 | 3.8 | 36.1 | 50.0 | 6.80 | 0.57 |
| 3 | 0.85 | 5.15 | 7.20 | 9.70 | 13.5 | 28.9 | 59.9 | 14.85 | 1.25 |
| 4 | 0.55 | 5.70 | 9.30 | 19.0 | 23.0 | 24.3 | 66.3 | 24.70 | 2.07 |

Water breakthrough is observed after injection of 0.23 pore volumes of water, a total of 32.6 percent of the original oil having been displaced prior to breakthrough.

*Example 2*

The test core of Example 1 is flushed with Skelleysolve B, purged with nitrogen, and dried as previously described. The permeability of the dried core is 2492 md. and the porosity is 33 percent. The dried core is saturated with 3 percent brine, flushed with 175 ml. of kerosene and then with 75 ml. of the refined oil employed in Example 1. The restored core is 61.5 percent oil saturated.

The core is then placed in a Hassler sleeve and subjected to water flooding by passing viscous water through the core at 20.0 p.s.i.g inlet pressure. This pressure is held constant throughout the test. The viscous water is formed by adding .05 weight percent partially hydrolyzed polyacrylamide to distilled water. The polyacrylamide is commercial ET–601 marketed by the Dow Chemical Company. Liquid displaced from the core is collected in cuts and the water-oil content of each cut determined. Results of these tests are as follows:

is dried at 1500° F. and acid extracted. The air permeability of the dried core is 2492 md. and the porosity is 33 percent. The test core is restored by saturating with 3 percent brine solution, flushing with 415 ml. kerosene and then with 140 ml. of the refined oil used in the previous examples. Finally, 15 ml. of an oil suspension of a viscosity modifying agent is injected into the core. The restored core is 65.8 percent oil saturated following the injection of the oil suspension.

The oil suspension is prepared by grinding commercial ET–601 powder using a mortar and a pestle. The ground material is classified by passage through a 200-mesh screen to obtain a solid portion of less than 200-mesh screen size. A suspension of 0.2 weight percent of these fines in the above refined oil is prepared. The solid particles in the suspension are further reduced in size and the suspension stabilized by repeated passage through a 3-roll paint mill. Finally the suspension is worked with a spatula on a smooth glass plate.

The core containing the injected viscosity modifier is placed in a Hassler sleeve and water flooded with distilled

TABLE B.—CONVENTIONAL VISCOUS WATER FLOOD

| Cut No. | Produced Oil, ml. | | Produced Water, ml. | | Producing Water/Oil Ratio | Oil Saturation, Percent | Oil Recovered, Percent Original | Cum. Water Injected | |
|---|---|---|---|---|---|---|---|---|---|
| | Cut | Cum. | Cut | Cum. | | | | Ml. | Pore Vol. |
| 0 | 0 | 0 | 0 | 0 | | 61.5 | 0 | 0 | 0 |
| 1 | 2.60 | 2.60 | 0 | 0 | 0 | 39.3 | 36.1 | 2.60 | 0.22 |
| 2 | 1.80 | 4.40 | 2.00 | 2.00 | 6.5 | 23.9 | 61.1 | 6.40 | 0.55 |
| 3 | 0.50 | 4.90 | 7.90 | 9.90 | 150+ | 19.7 | 68.1 | 14.80 | 1.26 |

Water breakthrough was observed after an injection of 0.22 pore volumes of water, 36.1 percent of the original oil having been displaced prior to breakthrough.

*Example 3*

A Boise sandstone core similar in size to that employed in Examples 1 and 2 is prepared as before and water at 20.0 p.s.i.g. injection pressure. Liquid displaced from the core by the injected water is collected in a number of cuts and the quantity of oil and water in each cut determined as before. These results are tabulated in the following Table C.

TABLE C.—PRE-INJECTED VISCOUS WATER FLOOD

| Cut No. | Produced Oil, ml. | | Produced Water, ml. | | Producing Water/Oil Ratio | Oil Saturation, Percent | Oil Recovered, Percent Original | Cum. Water Injected | |
|---|---|---|---|---|---|---|---|---|---|
| | Cut | Cum. | Cut | Cum. | | | | Ml. | Pore Vol. |
| 0 | 0 | 0 | 0 | 0 | | 65.8 | 0 | 0 | 0 |
| 1 | 4.60 | 4.60 | 0 | 0 | 0 | 29.3 | 55.4 | 4.60 | 0.36 |
| 2 | 1.20 | 5.80 | 2.80 | 2.80 | 8.4 | 19.8 | 69.9 | 8.60 | 0.68 |
| 3 | 0.22 | 6.02 | 7.30 | 10.10 | 150+ | 18.1 | 72.5 | 16.12 | 1.28 |

Water breakthrough is observed after recovery of 55.4 percent of the oil originally in place, this recovery being obtained with a water injection of 0.36 pore volumes prior to breakthrough.

The results obtained in this series of tests can be compared by reference to the drawings, of which:

Figure 1:
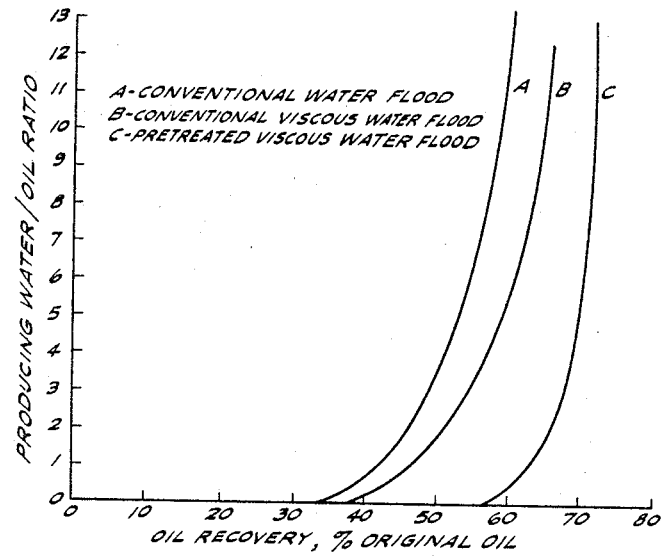
FIGURE 1 is a plot showing the producing water/oil ratio for the three test floods as a function of the percentage of original oil recovered.
Figure 2:
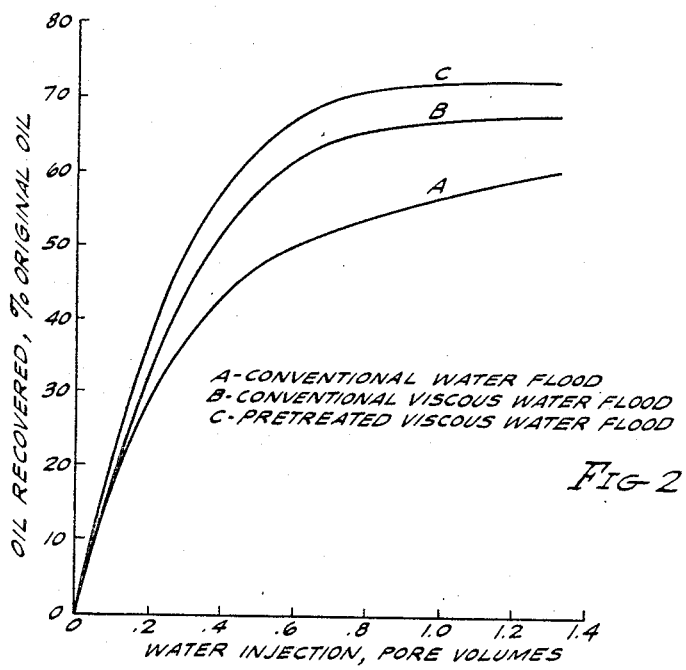
FIGURE 2 is a plot of the percentage of original oil recovered in the series of tests as a function of the pore volumes of water injected.

It is apparent from these data that improved performance, in terms of increased oil recovery per volume of injected water and decreased producing water/oil ratio, can be effected by conventional viscous water flooding techniques. Viscous water flooding delays water breakthrough until 36.1 percent of the original oil is recovered, as compared with breakthrough at 32.6 percent recovery with conventional high mobility water. The delayed water breakthrough is illustrated by curves A and B of FIGURE 1. Oil recovery per volume of water injected is higher with prior art viscous flooding than with conventional high mobility water, as demonstrated by curves A and B of FIGURE 2.

However, by predepositing viscosity modifier in the core prior to water injection according to the method of this invention, water breakthrough is delayed until 55.4 percent of the original oil is recovered, this recovery being obtained by injection of 0.36 pore volumes of water. This improvement is demonstrated by comparison of curve C of FIGURE 1 with curves A and B thereof. The oil recovery per volume of water injected is substantially higher than obtained by either conventional water flooding or prior viscous water flooding methods, as illustrated by curve C of FIGURE 2.

While particular embodiments of the invention have been described, it will be understood, of course, that the invention is not limited thereto since many modifications can be made, and it is intended to include within the invention any such modifications as fall within the scope of the claims.

The invention having thus been described, I claim:

1. A process for recovering petroleum from a subterranean oil-bearing formation penetrated by an input well and at least one spaced production well, which comprises:
   injecting a finely divided, water-soluble water viscosity increasing agent suspended in a non-solvent carrier liquid through at least one of said well bores and into said formation; and
   flooding said formation by injecting an aqueous flooding medium into said input well and forcing said medium through said formation toward said production well.

2. The process defined in claim 1 wherein said water viscosity increasing agent is relatively oil-insoluble and wherein said non-solvent carrier liquid is selected from the group consisting of crude petroleum oil and refined petroleum oil.

3. The process defined in claim 1 wherein said water-soluble viscosity increasing agent is a liquid, and wherein said non-solvent carrier liquid has finely dispersed therein up to about 20 weight percent of said water viscosity increasing agent.

4. The process defined in claim 1 wherein said water-soluble viscosity increasing agent is a finely divided solid, and wherein said non-solvent carrier liquid has suspended therein up to about 20 weight percent of said finely divided solid.

5. The process defined in claim 1 wherein said suspension of water viscosity increasing agent is injected into said formation in an amount sufficient to provide a concentration of between about .001 and about 10 weight percent of said water viscosity increasing agent in the water contained within the flood zone.

6. The process defined in claim 1 wherein said water viscosity increasing agent is a high molecular weight, water-soluble polymer.

7. The process defined in claim 6 wherein said polymer is partially hydrolyzed polyacrylamide.

8. The process defined in claim 7 wherein said partially hydrolyzed polyacrylamide has from about 12 to about 67 percent of the original carboxamide groups hydrolyzed to carboxyl groups and wherein said partially hydrolyzed polyacrylamide is characterized by a viscosity of at least 6 centipoises for a 0.5 percent by weight solution thereof in aqueous 4 percent by weight sodium chloride solution at a temperature of 25° C. as determined with an Ostwald viscosimeter.

9. In a process for recovering petroleum from a subterranean oil-bearing formation penetrated by an input well and at least one spaced production well, which comprises introducing an aqueous flooding medium into said input well and forcing said medium through said formation toward said production wells, the improvement which comprises the step of injecting a water-soluble water viscosity increasing agent into said formation prior to the injection of said flooding medium, said water viscosity increasing agent being injected as a finely divided suspension of up to about 20 weight percent of said agent in a non-solvent carrier liquid, and said suspension being injected in an amount sufficient to provide a concentration of said agent in said formation water of between about .001 and 10 weight percent.

10. The process defined in claim 9 wherein said non-solvent carrier liquid is selected from the group consisting of crude petroleum oil and refined petroleum oil.

11. The process defined in claim 9 wherein said water viscosity increasing agent is a high molecular weight, water-soluble polymer.

12. The process defined in claim 11 wherein said polymer is partially hydrolyzed polyacrylamide.

13. The process defined in claim 12 wherein said partially hydrolyzed polyacrylamide has from about 12 to about 67 percent of the original carboxamide groups hydrolyzed to carboxyl groups and wherein said partially hydrolyzed polyacrylamide is characterized by a viscosity of at least 6 centipoises for a 0.5 percent by weight solution thereof in aqueous 4 percent by weight sodium chloride solution at a temperature of 25° C. as determined with an Ostwald viscosimeter.

14. A process for recovering petroleum from a subterranean oil-bearing formation penetrated by two or more spaced well bores, which comprises:
   preparing a suspension of up to about 20 weight percent of a finely divided, high molecular weight, water-soluble, oil-insoluble polymer solid in a carrier liquid selected from the group consisting of crude petroleum oil and refined petroleum oil;
   injecting said suspension through at least one of said well bores and into said formation in an amount sufficient to provide a concentration of between .001 and 10 weight percent of said polymer in the formation water; and
   flooding said formation by injecting an aqueous flooding medium into a first of said well bores and forcing said medium through said formation toward the other of said well bores.

15. The process defined in claim 14 wherein said polymer is partially hydrolyzed polyacrylamide.

16. The process defined in claim 15 wherein said partially hydrolyzed polyacrylamide has from about 12 to about 67 percent of the original carboxamide groups hydrolyzed to carboxyl groups and wherein said partially hydrolyzed polyacrylamide is characterized by a viscosity of at least 6 centipoises for a 0.5 percent by weight solution thereof in aqueous 4 percent by weight sodium chloride solution at a temperature of 25° C. as determined with an Ostwald viscosimeter.

(References on following page)

References Cited

UNITED STATES PATENTS

| | | | |
|---|---|---|---|
| 2,920,041 | 1/1960 | Meadors | 166—9 |
| 3,044,544 | 7/1962 | Holbrook et al. | 166—9 |
| 3,076,504 | 2/1963 | Meadors et al. | 166—9 |
| 3,208,515 | 9/1965 | Meadors | 166—9 |
| 3,208,518 | 9/1965 | Patton | 166—9 |

CHARLES E. O'CONNELL, *Primary Examiner.*

JAMES A. LEPPINK, *Examiner.*